Feb. 20, 1923.
L. M. NEAL.
SHOCK ABSORBER.
FILED JAN. 12, 1921.
1,445,704.
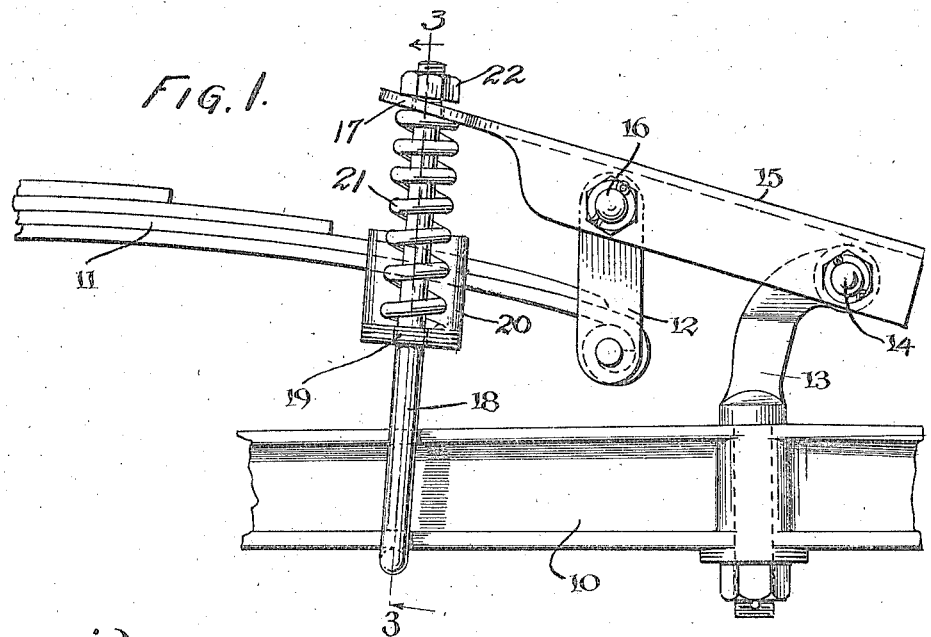
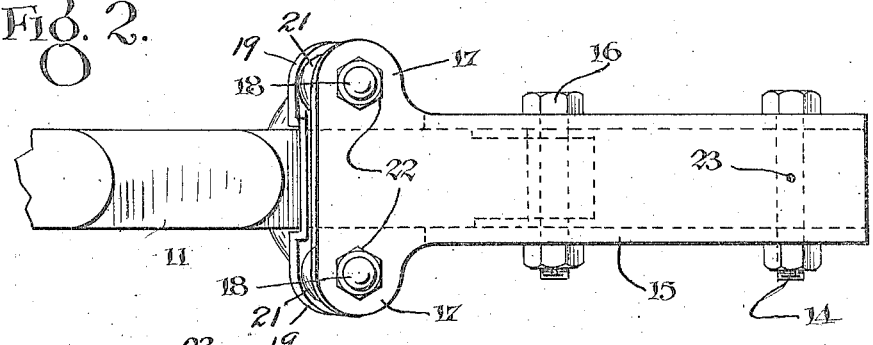
L. M. Neal.
INVENTOR
WITNESSES
BY
ATTORNEYS Patented Feb. 20, 1923.

1,445,704

UNITED STATES PATENT OFFICE.

LEWIS MORGAN NEAL, OF LOUISVILLE, KENTUCKY.

SHOCK ABSORBER.

Application filed January 12, 1921. Serial No. 436,739.

*To all whom it may concern:*

Be it known that I, LEWIS MORGAN NEAL, a citizen of the United States, and a resident of Louisville, in the county of Jefferson and State of Kentucky, have invented certain new and useful Improvements in Shock Absorbers, of which the following is a specification.

My present invention relates generally to shock absorbers and more particularly to a shock absorber of the type adaptable to transversely disposed body springs and therefore especially applicable to Ford automobiles, my object being the provision of a simple, strong and durable arrangement which will promote sightliness in appearance and may be readily and quickly installed by certain simple additions to the spring parts already in use.

In the accompanying drawing which illustrates my invention and forms a part of this specification, Figure 1 is a front view illustrating the practical application of my invention, Figure 2 is a top plan view of the parts shown in Figure 1, and Figure 3 is a vertical section taken through the parts substantially on line 3—3 of Figure 1.

Referring now to these figures I have shown the axle 10 and main transverse leaf spring 11 of a Ford automobile as the parts appear in the usual construction at the front, with the exception that the spring suspension links 12 are detached at their upper ends from the spring support 13 and the latter is utilized to support the pivot 14 at the outer end of a lever 15 of channel form, to which the upper ends of the links 12 are pivoted as at 16 intermediate the ends of the lever. The inner end of the lever is widened to form laterally deflected ears 17 through which the upper threaded ends of a U-bolt 18 extend. This U-bolt passes around the axle 10 with its extensions at the sides of the axles and projecting through the laterally flanged ends 19 of an inverted U-shaped spring supporting clip 20 fitting downwardly over the main leaf spring 11 adjacent to its outer end. The flanges 19 form one support for shock absorbing coil springs 21, disposed around the extensions of the U-bolt 18 and, as shown in Figures 1 and 2, normally under slight compression between the flanges 19 and the laterally deflected ears 17 of lever 15, above the latter of which the U-bolt extensions are threaded to receive nuts 22.

In this way, and in view of the normal curvature of the main leaf spring 11 it is quite obvious that the supporting clips 20 of the shock absorbing springs act to prevent undesirable sidesway and, in conjunction with the U-bolts 18, operate to effectively guide the parts in such a way as to allow free and unobstructed action of the leaf spring in its normal operation and still absorb all shocks and jolts in the rebound of the parts which in many instances in connection with the ordinary springs are as bad if not worse than the result if no main spring is present.

I having the lever 15 of the channel form shown, added protection is afforded to the suspension links 12 of the main leaf spring and to the support 13, which latter has its equivalent at the brake hubs in a rear construction, and the lever in addition forms an effective guide in connection with this support.

Lever 15 may have an oil hole 23 adjacent to its outer end, in line with the pivot bolt 14 so that the latter can be effectively lubricated, it being obvious that the other parts are readily accessible for purposes of lubrication at all times.

I claim:

1. The combination with the main leaf spring, its support and suspension links, of a lever pivotally connected adjacent to its outer end to the said main spring support and intermediate the ends of which the said spring suspension links are pivoted, an axle embracing U-bolt having its upper ends secured through the lever adjacent to the inner end of the latter, a supporting clip of inverted U-form seated on the main leaf spring and having lower outstanding flanges through which the extensions of the U-bolt loosely project, and shock absorbing springs coiled around the extensions of the U-bolt and extending between the flanges of said clip and the inner end of the said lever as described.

2. The combination with the main leaf spring, suspension links and support thereof, of a lever of channel form having depending side portions, a pivot connecting the outer end of the lever with the said spring support, a pivot intermediate the ends of the lever supporting the suspension links of the main leaf spring, an axle embracing U-bolt having its upper ends extending through the said lever adjacent to the inner end of the latter, a supporting clip seated on and partially embracing the main leaf spring and through portions of which clip the extensions of said U-bolt loosely project, and coil spring disposed around the extensions of the said U-bolt and extending between the said clip and the inner end of the lever.

LEWIS MORGAN NEAL.